United States Patent
Despres

(10) Patent No.: US 9,300,232 B2
(45) Date of Patent: Mar. 29, 2016

(54) METHOD FOR CONTROLLING A PERMANENTLY EXCITED SYNCHRONOUS MOTOR

(71) Applicant: MAGNA ELECTRONICS EUROPE GMBH & CO. KG, Sailauf (DE)

(72) Inventor: Mikael Despres, Darmstadt (DE)

(73) Assignee: MAGNA ELECTRONICS EUROPE GMBH & CO. kG., Sailauf (DE)

( * ) Notice: Subject to any disclaimer, the term of this patent is extended or adjusted under 35 U.S.C. 154(b) by 190 days.

(21) Appl. No.: 14/345,083

(22) PCT Filed: Sep. 18, 2012

(86) PCT No.: PCT/EP2012/068292
§ 371 (c)(1),
(2) Date: Mar. 14, 2014

(87) PCT Pub. No.: WO2013/041503
PCT Pub. Date: Mar. 28, 2013

(65) Prior Publication Data
US 2015/0008851 A1   Jan. 8, 2015

(30) Foreign Application Priority Data
Sep. 19, 2011 (DE) .......................... 10 2011 113 780

(51) Int. Cl.
*H03K 5/00* (2006.01)
*H02P 6/00* (2006.01)
(Continued)

(52) U.S. Cl.
CPC ............... *H02P 6/002* (2013.01); *H02P 6/001* (2013.01); *H02P 6/08* (2013.01); *H02P 21/0035* (2013.01);
(Continued)

(58) Field of Classification Search
CPC ... H02P 21/0035; H02P 25/021; H02P 6/001; H02P 6/002; H02P 23/0072; H02P 27/047
USPC ......... 318/400.2, 400.26, 700, 721, 722, 723, 318/438, 503, 512, 533, 538
See application file for complete search history.

(56) References Cited

U.S. PATENT DOCUMENTS 5,701,065 A * 12/1997 Ishizaki ............... H02P 25/023
                                                       318/400.17
6,373,211 B1 * 4/2002 Henry ..................... B62D 5/046
                                                       180/443
(Continued)

FOREIGN PATENT DOCUMENTS

| EP | 1466779 | 10/2004 |
|---|---|---|
| EP | 2133991 | 6/2011 |
| JP | 2006067667 | 3/2006 |

OTHER PUBLICATIONS
International Search Report dated Jul. 18, 2013 for corresponding PCT Application No. PCT/EP2012/068292.
(Continued)

*Primary Examiner* — Bentsu Ro
*Assistant Examiner* — Thai Dinh
(74) *Attorney, Agent, or Firm* — Gardner, Linn, Burkhart & Flory, LLP

(57) ABSTRACT

A method for controlling a permanently excited synchronous motor, in particular a brushless direct-current motor, having a permanently magnetized rotor and a number of stationary Stator windings to which an alternating voltage of predetermined amplitude and frequency is applied, wherein the frequency of the alternating voltage is determined by the speed of the motor and a phase difference results between the alternating voltage and the alternating current for each Stator winding. Accordingly, current is applied to the Stator windings in such a way that between alternating voltage ($U_{Phase}$) and alternating current ($I_{Phase}$) arises a phase angle ($\Psi_{Target}$, $\Psi'_{Target}$), which is selected according to speed ($\omega$), motor inductance (L), and the power received by the motor.

10 Claims, 1 Drawing Sheet

(51) Int. Cl.
    *H02P 25/02*     (2006.01)
    *H02P 21/00*     (2006.01)
    *H02P 23/00*     (2006.01)
    *H02P 6/08*     (2006.01)

(52) U.S. Cl.
    CPC ........ *H02P 21/0089* (2013.01); *H02P 23/0081* (2013.01); *H02P 25/021* (2013.01); *H02P 6/085* (2013.01)

(56) References Cited

U.S. PATENT DOCUMENTS

| | | | | |
|---|---|---|---|---|
| 6,462,491 B1 * | 10/2002 | Iijima | ............... | H02P 9/18 318/400.09 |
| 6,462,492 B1 * | 10/2002 | Sakamoto | ............... | H02P 6/18 318/400.02 |
| 6,694,287 B2 * | 2/2004 | Mir | ............... | H02P 6/08 318/565 |
| 6,965,212 B1 | 11/2005 | Wang et al. | | |
| 8,860,342 B2 * | 10/2014 | Krefta | ............... | H02P 21/06 318/400.01 |
| 8,866,423 B2 * | 10/2014 | Suel, II | ............... | H02P 23/009 318/163 |

OTHER PUBLICATIONS

German Search Report dated Oct. 27, 2011 for German patent Application No. 102011113780.0.
Schulze, M., "Elektrische Servoantriebe" Hanser Verlag, 2008, Seiten 77 bis 81.
Wolfgang Oberschelp: "Synchronmaschine", Feb. 1, 2004, XP055071826, retrieved from the Internet: URL: http://elektrotechnik.fh-gelsenkirchen.de/fileadmin/FB1/peelen/pdfs/praktikum/Synchronmashine.pdf (retrieved on Jul. 17, 2013).

* cited by examiner

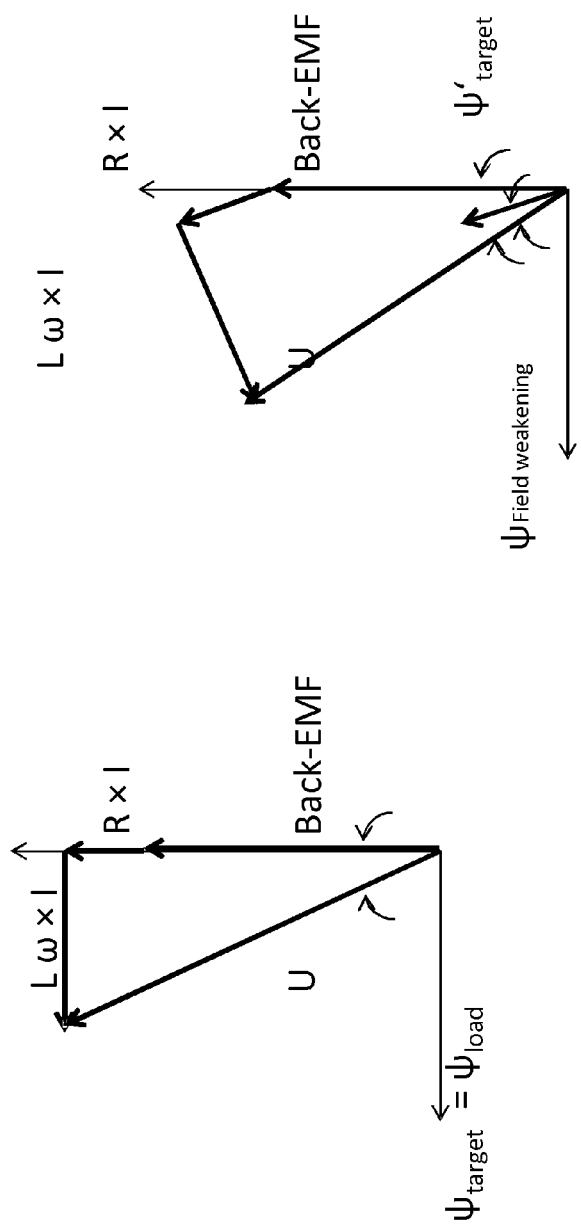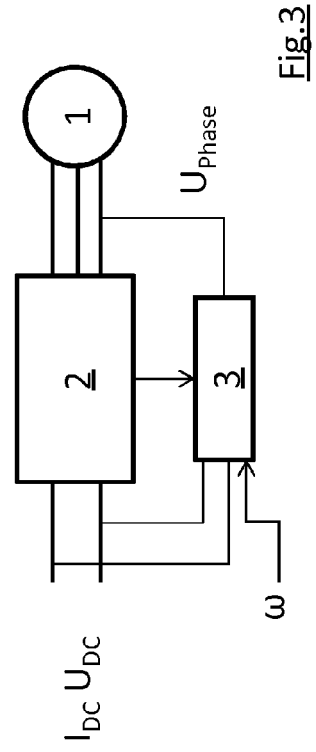

METHOD FOR CONTROLLING A PERMANENTLY EXCITED SYNCHRONOUS MOTOR

CROSS REFERENCE TO RELATED APPLICATION

The present application is a 371 U.S. national phase application of PCT Application No. PCT/EP2012/068292, filed Sep. 18, 2012, which claims the filing benefit of German Application No. 10 2011 113 780.0, filed Sep. 19, 2011.

FIELD OF THE INVENTION

The invention relates to a method for controlling a permanently excited synchronous motor, in particular a brushless direct-current motor as well as a control designed such that it executes the method.

BACKGROUND OF THE INVENTION

With known brushless direct-current motors, energizing the Stator windings is performed via an inverter. The permanently magnetized rotor follows the revolving field. In order to regulate to predetermined values, data are obtained from the drive, the inverter and/or the upstream voltage transformer and are processed in the control logic in connection with a speed value to be used to drive the motor, into signals controlling the inverter, so that the inverter is able to generate the required alternating voltage to be applied to the windings.

In order for the rotor to be able to follow a voltage curve at a predetermined speed in the best possible manner, a certain phase angle must exist between voltage and current, the voltage is ahead of the current, which requires a different angle depending on the load. If, in consideration of the load to be driven by the motor, adjustment is made strictly to this angle, then electronics must be configured for the high idle current resulting from the maximum load, requiring component expenditures.

From EP 2 133 991 B1, a centrifugal pump aggregate with an electric drive motor and a control device comprising a frequency converter for speed regulation is known. The control device is designed such that a weakening of the drive motor's field is generated in a predetermined control range, so that the drive motor's speed is increased.

U.S. Pat. No. 6,965,212 describes the operation of an electrical drive motor utilizing field weakening. Field weakening facilitates a minimizing of the voltage necessary to energize the motor at a specific speed.

SUMMARY OF THE INVENTION

It is the purpose of the invention to improve the method as well as the control executing the method according to the preamble of claim 1, specifically in view of the expenditure related to technical components.

This purpose is met by the characteristic features indicated in patent claim 1, respectively 6.

BRIEF DESCRIPTION OF THE DRAWINGS

FIGS. 1 and 2 show the vector of voltage U, as well as phase angle $\Psi$ between current I and voltage U on one level; and FIG. 3 shows a control according to the invention for a brushless direct-current motor.

DESCRIPTION OF THE PREFERRED EMBODIMENTS

The invention provides that the phase angle between phase current and phase voltage is computed with output fed into the inverter, the phase voltage at the inverter, current speed and the value of motor inductance. Therefore adjustment is made for the angle between current and voltage, and not—as otherwise customary—for the angle between BEMF/rotor position and voltage.

The invention records the direct-current and voltage intake, the direction of the current and the phase voltage provided by the inverter. The corresponding phase current is computed by means of these values in a manner subsequently illustrated. This is advantageous in that the BEMF must be recorded as unknown.

Based upon space vector modulation, the following applies to maximum phase voltage $U_{max}$, which can be generated by the inverter from direct voltage $U_{DC}$:

$$U_{max} = U_{DC}/\sqrt{3}$$

If U is greater than $U_{max}$, then phase voltage is limited to $U_{Phase} = U_{max}$. In this context, U is the voltage output by the modulator in order to reach the target angle.

The phase current resulting from the available phase voltage is determined by the direct voltage output, which is the product of the values from the direct current and direct voltage, fed into the inverter. It is therefore approximated that the following applies to phase current $I_{Phase}$:

$$I_{Phase} = \frac{1}{3} \times (I_{DC} \times U_{DC})/(U_{Phase} \times \cos \Psi)$$

Thus it is:

| | |
|---|---|
| $U_{Phase}$ | Phase voltage |
| $U_{DC}$ | Direct voltage value |
| $I_{DC}$ | Direct current value |
| $\Psi$ | The phase angle between phase voltage and phase current |

Therefore at a small angle $\Psi$, the following applies to approximated phase current:

$$I_{Phase} = \frac{1}{3} \times (I_{DC} \times U_{DC})/(U_{Phase})$$

It is taken advantage of the fact that for lesser values of approximated $\Psi$ applies:

$$\cos \Psi \approx 1$$

In order to minimize idle current, load angle $\Psi$ $I_{Load}$ is defined as follows:

$$\Psi_{Load} = \arcsin(I_{Phase} \times \omega \times L)/(U_{Phase}))$$

For small angle $\Psi$ $I_{Load}$ then applies:

$$\Psi_{Load} = (I_{Phase} \times \omega \times L)/U_{Phase}$$

whereby advantage is taken of the fact that for smaller angles of approximated $\Psi_{Last}$, applies:

$$\arcsin(I_{Phase} \times \omega \times L)/U_{Phase})) \approx (I_{Phase} \times \omega \times L)/U_{Phase}$$

In this case $\omega$ is the frequency, motor speed,

L the motor's inductance.

As far as values are concerned, phase voltage $U_{Phase}$ was less than $U_{max}$ in the aforementioned illustrated case. Target angle $\Psi_{Target}$, for which adjustment is made, is in this case:

$$\Psi_{Load} = \Psi_{Load} \text{ for } U \leq U_{max}$$

If U is greater than $U_{max}$, then the target angle is modified by adding field weakening angle $\Psi$ to $\Psi_{Load}$.

$$\Psi_{Load} + \Psi_{Field\ Weakening}$$

This modified angle, for which an adjustment is made, results in a reduction in voltage. Therefore for target angle $105_{Target}$, for which adjustment is made, applies:

$$\Psi_{Target} = \Psi_{Load} + \Psi_{Field\ Weakening}\ \text{for}\ U >_{max} \quad (5)$$

The target angle is therefore adjusted such that it is maintained with the available voltage.

For the field weakening angle applies:

$$\Psi_{Field\ Weakening} = (U_{max} - U)/(I_{Phase} \times \omega \times L)$$

Generally target angle $\Psi_{Target}$ is therefore selected as follows in the execution of the invention:

with
$\Psi_{Target} = \Psi_{Load} + \Psi_{Field\ Weakening}$
$\Psi_{Field\ Weakening} = 0$ for $U \geq U_{max}$, and
$\Psi_{Field\ Weakening} = (U_{max} - U)/(I_{phase} \times \omega \times L)$ for $U > U_{max}$ For the value of phase current $I_{Phase}$, the approximate value illustrated further above is used, whereby $I_{Phase} = \frac{1}{3}((I_{DC} \times U_{DC})/(U_{Phase})$.

Target angle $\Psi_{Target}$, for which adjustment is made according to the invention, is therefore only a value, which depends on the existing direct-voltage and direct-current values (power received), motor speed and motor inductance.

FIGS. 1 and 2 show the vector of voltage U, as well as phase angle $\Psi$ between current I and voltage U on one level. In this case the vector of voltage U is the sum of the Back-EMF, the voltage drop at the Ohmic resistance of winding R×I as well as the vector positioned vertically thereto L$\omega$×I, thus the vector product of current I and speed $\omega$.

The situation illustrated in FIG. 1 indicates no field weakening, i.e. for the value of the voltage, applies $U \leq U_{max}$. In this case $\Psi Target = \Psi_{Load}$ is selected, and $\Psi_{Load}$ is calculated as previously explained.

FIG. 2 shows a case in which by means of field weakening in selecting an accordingly greater phase angle $\Psi_{Target}$, the value of voltage U can be limited to $U = U_{max}$ (if $U > U_{max}$). This corresponds to the situation for which $\Psi'_{Target} = \Psi_{Load} + \Psi_{Field\ Weakening}$ is selected. $\Psi_{Load}$ and $\Psi_{Field\ Weakening}$ are computed as indicated.

FIG. 3 shows a control according to the invention for a brushless direct-current motor. Motor 1 depicts a permanently magnetized rotor and Stator windings in an inherently known and not further illustrated manner. The Stator windings are energized by means of inverter 2. Inverter 2 is supplied with direct current IDC and direct voltage $U_{DC}$ by means of a voltage transformer not further illustrated.

Control 3 receives signals corresponding to the values of direct-current $1_{DC}$ and direct-voltage $U_{DC}$ input, in other words giving an account of power received. In addition, the control is supplied with a signal by phase voltage $U_{Phase}$, which is indicated in the figure. Finally, control 3 receives a signal corresponding to speed $\omega$ to which the motor is to be set. According to the demonstrated method of calculation, inverter 2 now performs the Stator windings' energizing such that target angle $\Psi_{Target}$ holds a predetermined value between phase voltage U Phase and phase current $I_{Phase}$.

As has already been illustrated, this target angle $\Psi_{Target}$ is determined by the direct-current power received, the speed, the voltage value as well as the predetermined value for motor inductance L. The case of voltage limitation $U = U_{max}$ results in field weakening by a value $\Psi_{Field\ Weakening}$, determined as previously shown.

| Reference symbols | |
|---|---|
| $U_{DC}$ | Direct voltage |
| $I_{DC}$ | Direct current |
| U | Voltage specification modulator |
| $U_{Phase}$ | Phase voltage |
| $I_{Phase}$ | Phase current |
| L | Motor inductance |
| $\omega$ | Speed |
| $\Psi_{Load}$ | Phase angle Load |
| $\Psi_{Target}$, $\Psi'_{Target}$ | Phase angle Target |
| $\Psi_{Field\ Weakening}$ | Angle Field Weakening |
| Motor | |
| Inverter | |
| Control | |

The invention claimed is:

1. A method for controlling a permanently excited synchronous motor, said method comprising:
   providing a motor having a permanently magnetized rotor and a number of stationary stator windings to which an alternating voltage of predetermined amplitude and frequency is applied:
   determining the frequency of the alternating voltage by the speed of the motor and a phase difference results between the alternating voltage and the alternating current for each stator winding; and
   applying the current to the stator windings in such a way that, between alternating voltage ($U_{Phase}$) and alternating current ($I_{Phase}$), a phase angle ($\Psi_{Target}$, $\Psi'_{Target}$) arises, which is selected according to speed ($\omega$), motor inductance (L) and the power received by the motor.

2. A method according to claim 1, wherein the motor comprises a brushless direct-current motor, and wherein the power received by the motor is determined by the direct-current and voltage values ($I_{DC}$, $U_{DC}$) supplied to the inverter.

3. A method according to claim 2, wherein the phase angle ($\Psi_{Target}$), which is selected depending on the speed, is determined by $\Psi_{Target} = (I_{Phase} \times \omega \times L)/U_{Phase}$, with $I_{Phase} = \frac{1}{3} \times (I_{DC} \times U_{DC})/(U_{Phase})$, whereby L is motor inductance and $U_{Phase}$ is the phase voltage in contact with the stator winding.

4. A method according to claim 3, comprising limiting voltage U predetermined by a modulator to a maximum value $U_{max}$, which results in field weakening by value ($\Psi_{Field\ Weakening}$) toward phase angle ($\Psi_{Target}$).

5. A method according to claim 4, wherein a value ($\Psi_{Field\ Weakening}$) predetermined for field weakening is computed as $\Psi_{Field\ Weakening} = (U_{max} - U)/(I_{Phase} \times \omega \times L)$.

6. A method according to claim 1, wherein the phase angle ($\Psi_{Target}$), which is selected depending on the speed, is determined by $\Psi_{Target} = (I_{Phase} \times \omega \times L)/U_{Phase}$, with $I_{Phase} = \frac{1}{3} \times (I_{DC} \times U_{DC})/(U_{Phase})$, whereby L is motor inductance and $U_{phase}$ is the phase voltage in contact with the stator winding.

7. A method according to claim 6, comprising limiting voltage U predetermined by a modulator to a maximum value $U_{max}$, which results in field weakening by value ($\Psi_{Field\ Weakening}$) toward phase angle ($\Psi_{Target}$).

8. A method according to claim 7, wherein a value ($\Psi_{Field\ Weakening}$) predetermined for field weakening is computed as $\Psi_{Field\ Weakening} = (U_{max} - U)/(I_{Phase} \times \omega \times L)$.

9. A control for a permanently excited synchronous motor, with a permanently magnetized rotor and a number of stationary stator windings, which can be subjected to alternating current of a preset amplitude and frequency by means of an inverter, whereby the predetermined speed to operate the motor can be preselected for the inverter, wherein the control is connected to the inverter and is supplied with a signal corresponding to the power received by the motor and also speed (ω) as well as phase voltage ($U_{Phase}$) in contact with the stator winding, whereby this phase voltage causes the generation of phase angle ($\Psi_{Target}$, $\Psi'_{Target}$), which is selected depending on speed (ω), motor inductance (L) and the power received by the motor, between alternating voltage ($U_{Phase}$) and alternating current ($I_{Phase}$) by means of the inverter.

10. A control according to claim 9, wherein the control is able to receive signals corresponding to direct-current and direct-voltage values ($I_{DC}$, $U_{DC}$).

\* \* \* \* \*